United States Patent [19]
Zodrow et al.

[11] Patent Number: 4,697,691
[45] Date of Patent: Oct. 6, 1987

[54] APPARATUS FOR TRANSFERRING ARTICLES, ESPECIALLY BOTTLES

[75] Inventors: Rudolf Zodrow; Rainer Buchholz, both of Düsseldorf, Fed. Rep. of Germany

[73] Assignee: Jagenberg Aktiengesellschaft, Düsseldorf, Fed. Rep. of Germany

[21] Appl. No.: 828,042

[22] Filed: Feb. 10, 1986

[30] Foreign Application Priority Data

Feb. 11, 1985 [DE] Fed. Rep. of Germany ....... 3504555

[51] Int. Cl.⁴ ........................................... B65G 47/26
[52] U.S. Cl. ................................... 198/425; 198/431; 198/433; 198/441; 198/450; 198/476.1
[58] Field of Search ............ 198/425, 426, 441, 470.1, 198/471.1, 420, 431, 433, 450, 476.1, 475.1, 447

[56] References Cited

U.S. PATENT DOCUMENTS

| | | | |
|---|---|---|---|
| 1,326,903 | 1/1920 | Augensen | 198/441 |
| 2,744,608 | 5/1956 | Ardell et al. | 198/425 |
| 3,303,926 | 2/1967 | Pohl | 198/471.1 |
| 3,491,511 | 1/1970 | Nigrelli et al. | 198/425 |
| 3,659,694 | 5/1972 | Harris | 198/470.1 |
| 3,850,096 | 11/1974 | Taniguchi | 198/425 |
| 3,880,294 | 4/1975 | Arseneault | 198/470.1 |
| 3,923,142 | 12/1975 | Rysti | 198/475.1 |
| 4,164,997 | 8/1979 | Mueller | 198/441 |
| 4,467,908 | 8/1984 | Schneider | 198/441 |
| 4,469,217 | 9/1984 | Meyer et al. | 198/425 |
| 4,511,027 | 4/1985 | Zamboni | 198/470.1 |

FOREIGN PATENT DOCUMENTS

| | | | |
|---|---|---|---|
| 1477801 | 10/1969 | Fed. Rep. of Germany ... | 198/470.1 |
| 3141364 | 12/1984 | Fed. Rep. of Germany . | |
| 2379439 | 9/1978 | France | 198/425 |

Primary Examiner—Joseph E. Valenza
Assistant Examiner—Cheryl L. Gastineau
Attorney, Agent, or Firm—Karl F. Ross; Herbert Dubno

[57] ABSTRACT

A distributing apparatus for transferring bottles between conveyors or processing machines like labelling machines or capping machines and the like includes a rotating carrier supporting at least one transfer member which rotates or oscillates with respect to the carrier. The transfer member is of segmental shape and includes a plurality of circumferential pockets for receiving the bottles. The outer face between the pockets is of convex contour so that the transfer member rolls off the conveyor or processing machine when picking up or delivering the bottles.

9 Claims, 6 Drawing Figures

4,697,691

APPARATUS FOR TRANSFERRING ARTICLES, ESPECIALLY BOTTLES

FIELD OF THE INVENTION

Our present invention refers to an apparatus for transferring articles, especially upright bottles, between successive processing steps.

BACKGROUND OF THE INVENTION

In a known apparatus for distributing or transferring bottles, pneumatically operated tubular grippers are used which are lowered towards the bottles to grasp the neck thereof and to transfer them in series or in groups to the successive processing step. After grasping the conical neck of the bottles which are supplied in a conveying direction as well as transversely thereto, the grippers lift the bottles to swing them in a suspended position about a horizontal axis toward the next location. After releasing the pressure provided by the compressed air to allow further advance of the bottles, the grippers return to their original positions to pick up the next group of bottles.

Such an intermittently operating apparatus has the disadvantage that the bottles may lose their stability and tip over when being grasped by the grippers or placed onto the respective location. This is especially true when the bottles are to cooperate with a moving conveyor or the bottle bottom is damaged. Consequently, an operator must continuously be placed on guard to restore dropped bottles to the upright position so as to secure a trouble-free transportation thereof. Apart from the fact that such grippers are expensive in design due to the swivelling about the horizontal axis, the use thereof damages any foil wrap of the caps of bottles stripped from the grippers so that the appearance of the bottles is marred.

German Pat. No. 31 41 364 and U.S. Pat. No. 4,467,908 disclose a distributing device using a main star-wheel conveyor which receives continuously supplied bottles and cooperates with two further star-wheel conveyors arranged at its circumference in such a manner that the bottles are alternatingly passed from the main star-wheel conveyor to the further star-wheel conveyors. Associated with each of the further star-wheel conveyors is a double row take-out conveyor so that the bottles are respectively transferred in two rows.

Although achieving a controlled reduction of the transport speed and transfer of the bottles into two separate rows, the distributing device is very complicated especially when it comes to a trouble-free transfer between the star-wheel conveyors. Since the star-wheels are provided with varying pitch and do not fittingly engage with each other, the bottles must be laterally shifted so that unstable areas especially at the transfer point to the first star-wheel are obtained. This leads to an inexact guidance of the bottles which thus may wobble and tip over thus resulting in an interruption of the transport. Taking into account that the further star-wheels run at a different speed than the double-lane conveyor belts, the bottles which already tend to wobble at the essentially guideless exchange points between the star-wheels will further loose their stability by the transfer onto the slower conveyor belts so that a great number of bottles will eventually tip over.

OBJECTS OF THE INVENTION

It is thus the principal object of our present invention to provide an improved distributing or transfer apparatus obviating the afore-stated drawbacks.

Another object of the present invention is to provide a distributing or transfer apparatus for upright bottles which allows high-speed transfer, uses a structure of lower cost, ensures a well-defined path of transfer so that the appearance and integrity of the bottles is not altered and at no point is the speed of such transfer diminished by the improved smoothness thereof.

SUMMARY OF THE INVENTION

We realize this object, in accordance with our present invention, by providing a carrier which has at least one transfer element movable with respect to the carrier and passing past the receiving point for successively picking up the bottles and the transfer point for delivering the bottles.

Through the provision of such a transfer element, the bottles supplied at a high speed can easily and along a shortest path almost simultaneously be placed side-by-side on a multi-lane conveyor while the speed with which the bottles are placed on the conveyor corresponds essentially to the speed of the latter. Consequently, the bottles are placed on the conveyor without contacting each other thus considerably reducing the noise level. Receiving, guidance and transfer of the bottles is accurate and secure. Especially advantageous is the versatility of the distributing apparatus according to the invention as the transfer elements cannot only be used to receive the bottles from a single-lane supply and transfer them to a multi-lane conveyor but also vice versa. This is achieved regardless whether the respective processing machines or conveyors extend in curved or linear manner. Since the bottles are grasped along their lower portion, foil wraps of bottles will not be damaged.

According to a further feature of our invention, the transfer elements can perform a full revolution between two successive picking up steps so that the bottles are transported along a shortest path over the center of the rotating carrier from one side to the other side. It is, however, also possible to have the transfer elements oscillating with respect to the carrier so that the bottles are transported continuously along the peripheral area of the carrier. Consequently, the bottles can be transferred at almost any location at the circumference of the carrier.

For receiving the bottles, the transfer element is provided with semicircular pockets. The other face between adjacent pockets is of convex shape and contacts or rolls off the processing machine or conveyor so as to impart to the transfer element a corresponding speed and to allow a trouble-free transfer of bottles between the transfer element and the respective processing machine or conveyor. Thus, the transfer element is alternatively accelerated and retarded to correspond with the speed of the respective processing machine or conveyor.

The desired smooth pickup or transfer of the bottles by or from the convexly curved pocketed periphery of the transfer sectors which are continuously or discontinously driven can be ensured by having the pocketed periphery move counter to the carrier about a respective pivot axis via a transmission such as a nonuniform-speed transmission. The transmission includes a slave (groove) cam surrounding the axis of rotation of the carrier and each transfer sector can have a cam follower engaged in the cam groove.

Alternatively the sector drive can include pinions (planetary gears) individual to the sectors and meshing with an internally toothed gun gear, the pinions being mounted on the free ends of the pivot shafts of the sectors.

Yet another transmission variant for the nonuniform-speed transmission can be an internally toothed ring concentric to the carrier and whose tooth pitch is nonuniform and meshes with a drive pinion which is affixed to the respective pivot shaft of a sector.

A whole range of transmissions can be used to accelerate and decelerate the sectors as desired apart from those mentioned above. For example summing transmissions having two independent transmission inputs can be used with the two inputs being variably superimposed to generate the desired acceleration or deceleration at the output, i.e. the sectors.

It is also advantageous that the sectors are swingably mounted on the carrier eccentrically, the carrier being a disk and the sectors being circular segments whose pivot axes are eccentric to the disk axis and lie on a plane of symmetry through the curved pocketed surface.

Accommodated within the transfer element are clamping or suction elements which cooperate with the pockets to securely retain the bottles therein during their transport between the respective exchange points.

BRIEF DESCRIPTION OF THE DRAWING

The above and other objects, features and advantages of our present invention will become more readily apparent from the following description, reference being made to the accompanying highly diagrammatic drawing in which.

SPECIFIC DESCRIPTION

Figure 1:
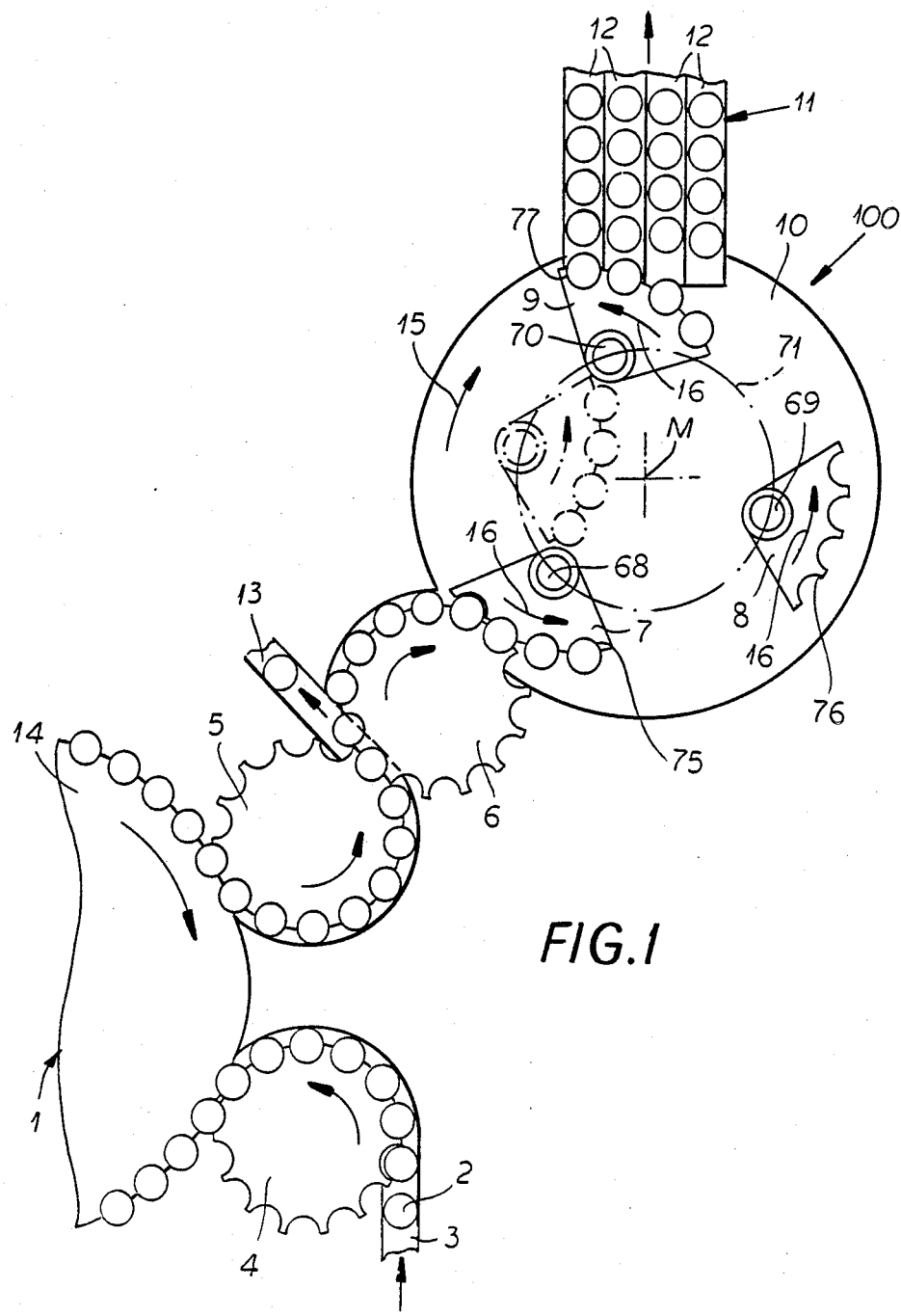
FIG. 1 is a plan view of one embodiment of a distributing apparatus according to the invention for transferring bottles between two transfer points.

Referring firstly to FIG. 1 which shows in plan view a first embodiment of a distributing apparatus generally designated by reference numeral 100 and provided for transferring vessels like bottles 2 from a bottle processing machine 1 to a conveyor 11 which transports the bottles 2 to the next processing station. The processing machine 1 which may be a labelling machine, bottling machine, bottle inspector or the like includes a bottle table 14 which is supplied with bottles 2 via feed conveyor belt 3 and star-wheel conveyor 4 and successively supports at its outer circumference the bottles 2 which are then consecutively transferred to a first star-wheel conveyor 5. Objectionable or damaged bottles 2 are removed via conveyor 13 while the remaining bottles 2 are transferred to a second star-wheel conveyor 6 which feeds the distributing apparatus 100.

The distributing apparatus according to FIG. 1 includes a ring-shaped carrier 10 which rotates in clockwise direction as indicated by arrow 15 and eccentrically supports three segmental transfer elements 7, 8, 9 uniformly spaced at its peripheral area about a circle 71 whose center coincides with the center M of the carrier 10. Each transfer element 7, 8, 9 rotates about a pivot 68, 69, 70 in counterclockwise direction as indicated by arrow 16 and includes four semicircular pockets 75, 76, 77 for grasping the bottles 2 in successive order from the star-wheel conveyor 6. The outer face 72, 73, 74 of each transfer element 7, 8, 9 is convex so as to contact or roll off the star-wheel 6 when picking up the bottles 2 and off the conveyor belt 11 when placing the bottles 2 thereon. Thus, the transfer elements 7, 8, 9 are accordingly accelerated or retarded when the outer face 72, 73, 74 contacts the respective element during the exchange of bottles 2.

Preferably, the pivots 68, 69, 70 about which the segmental transfer elements 7, 8, 9 revolve are arranged on the respective axis offset from the axis M.

Cooperating with the pockets 75, 76, 77 are suction and clamping elements for securely grasping the bottles 2 during their transport by the transfer elements 7, 8, 9. The suction and clamping elements are of conventional type and thus not shown in the drawing.

Figure 4:
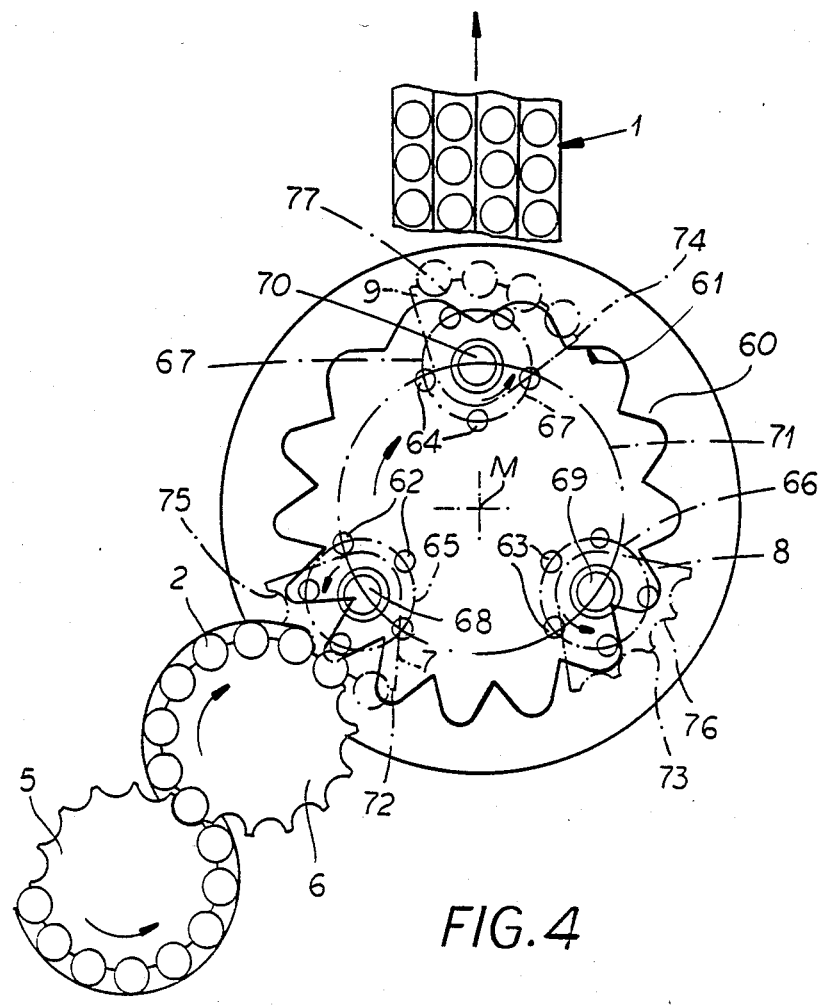
FIG. 4 is a schematic illustration of the distributing apparatus according to FIG. 1 equipped with one example of a transmission unit for driving the latter.

Turning now to FIG. 4 which illustrates the drive of each transfer element 7, 8, 9, it may be seen that the carrier 10 is provided at its underside with a stationary cam 60 in form of a toothed ring with variable circular pitch between the teeth. Each transfer element 7, 8, 9 is provided with a respective group of rollers 62, 63, 64 which run along the flanks 61 of the cam 60. The rollers 62, 63, 64 form part of a lantern tooth system and are supported in respective rotating driving pins 65, 66, 67 which are fixedly connected to the pivots 68, 69, 70.

The varying pitch of the teeth of the cam 60 allows the transfer elements 7, 8, 9 to rotate within certain ranges at any desired acceleration or deceleration so that the speed of the transfer elements 7, 8, 9 is adjustable to the speed at the transfer points to the succeeding or preceding conveyor. The desired speed to operate the transfer elements 7, 8, 9 can also be adjusted by respective design of the segmental shape of these transfer elements 7, 8, 9. Moreover, the distance between the pivots 68, 69, 70 to the convex outer surface 72, 73, 74 as well as the diameter of the circle 71 can be selected in any appropriate manner to provide the desired speed for the transfer elements 7, 8, 9.

The distributing apparatus 100 operates as follows:

As can be seen in FIG. 1, the last of the pockets 75 of the transfer element 7 has just received a bottle 2 while simultaneously, the first bottle 2 is just released from the respective pocket 77 of the transfer element 9 onto the first lane 12 of the slowly moving four-lane or four-belt transport conveyor 11. The pockets 76 of the transfer element 8 are empty to receive the next group of bottles 2. During the advance of the carrier 10 in direction of arrow 15, the transfer element 7 rotates counterclockwise and occupies the position indicated in dash-dot lines until reaching the position to where it discharges the bottles 2 onto the lanes 12 of the transport conveyor 11. When reaching the conveyor 11, the outer face 72 of the transfer element 7 comes into contact therewith so that the transfer element is at the same speed as the conveyor 1. Simultaneous with the advance of the transfer element 7 toward the conveyor 11 the transfer elements 8 and 9 are advanced in the same manner so that, the transfer element 8 can receive the bottles 2 while the transfer element 9 is empty. The speed of the carrier 10 is so selected that each transfer element 7, 8, 9 performs one revolution between picking up two successive groups of bottles 2.

Although FIG. 1 illustrates the arrangement of a pair of intermediate star-wheel conveyors 5, 6, it is certainly possible to have the bottles 2 directly transferred from the bottle table 14 of the processing machine 1 to the distribution apparatus 100. However, such an arrangement would not allow a removal of objectionable bottles 2 prior to their transfer to the distributing apparatus 100. If it is desired to use at least the star-wheel conveyor 5, then the carrier 10 rotates in counterclockwise direction while the individual transfer elements 7, 8, 9 rotate in clockwise direction.

Figure 1A:
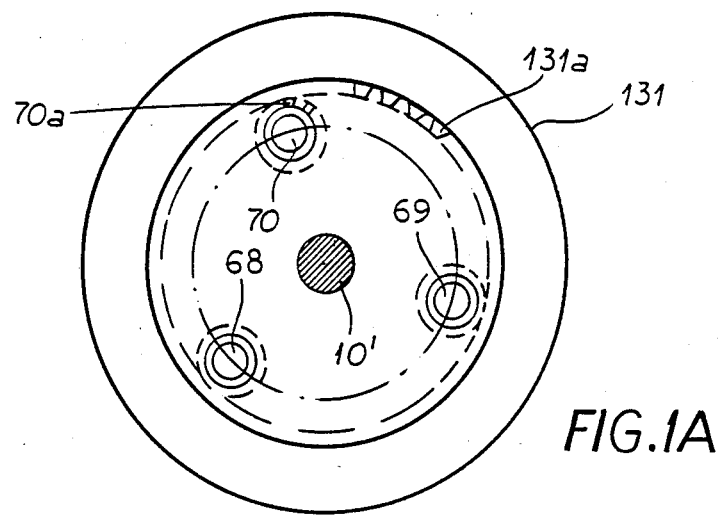
FIGS. 1A and 1B are detail views in section and plan, respectively, of the drive for the transfer sectors and the sector structure.

FIG. 1A shows a drive variant in which the pinions 70a etc of the pivot shaft 68-70 of the sectors 7-9, affixed to free ends of the shafts, mesh with the variably-spaced teeth 131a of an internally toothed gun gear 131 to achieve acceleration and deceleration as the sectors swing counter to the direction in which the carrier disk 10 on shaft 10' is rotated.

Figure 1B:
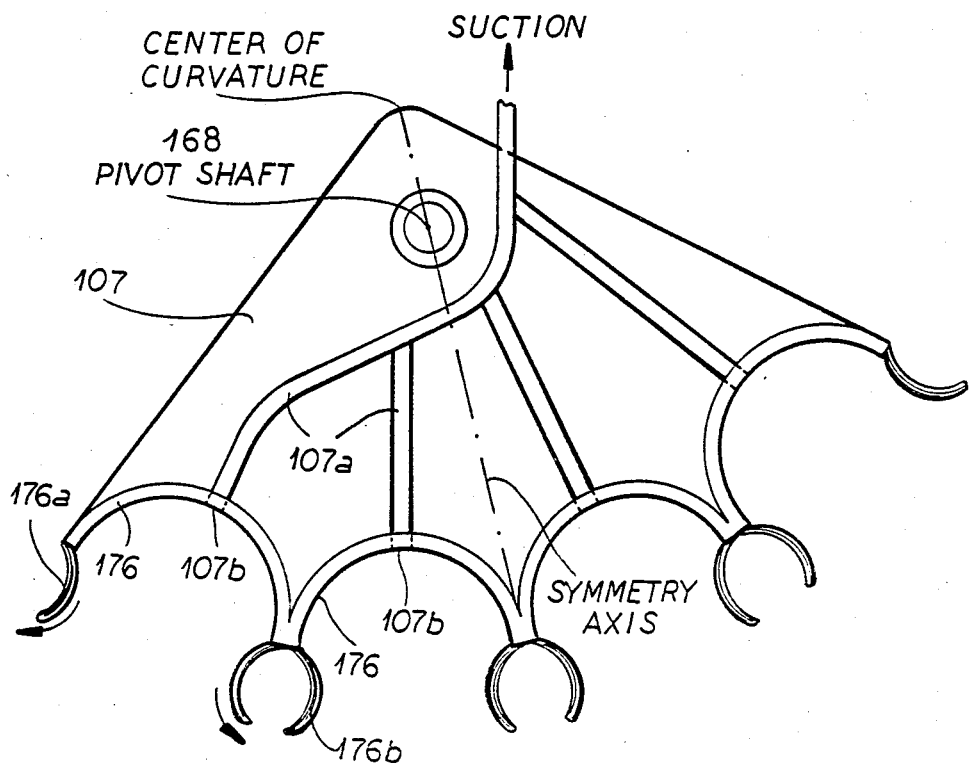

FIG. 1B indicates that each sector 107 etc can have pockets 176 which are provided with orifices 107b at which suction lines 107a terminate to retain the bottles in part by suction. The bottles can also be retained in part by spring clips wich can be spread as shown by arrows to receive and release the bottles.

Figure 2:
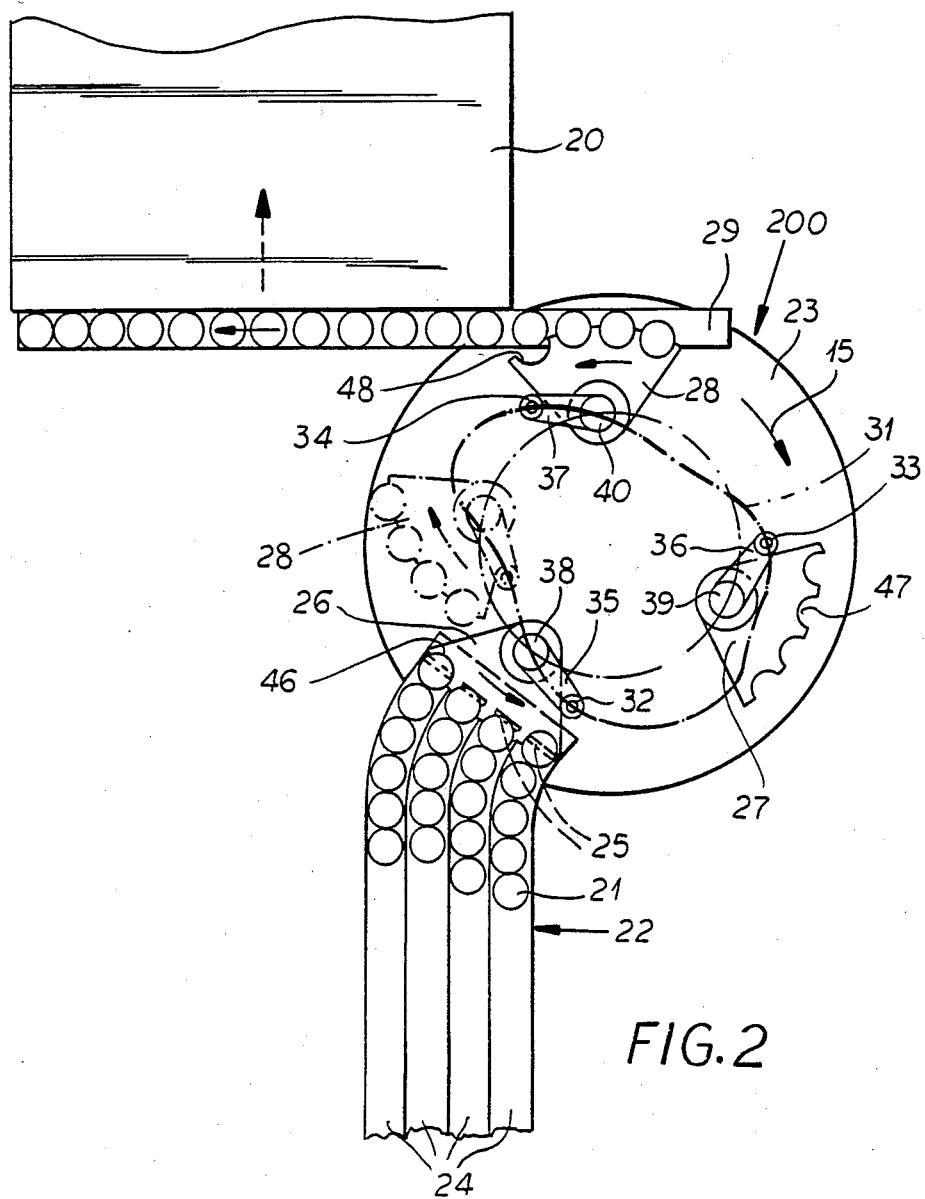
FIG. 2 is a plan view of a second embodiment of a distributing apparatus according to the invention for transferring bottles between two transfer points.

Turning now to FIG. 2 which shows a second embodiment of a distributing apparatus 200 provided for picking up a group of bottles 22 from a multi-lane conveyor belt 22 and discharging the bottles 21 successively onto a single-lane conveyor belt 29 of a processing machine like e.g. a bottle cleaning machine 20. In the present example, the conveyor 22 is provided with four lanes 24 which radially supply the carrier with the bottles 21. Arranged at the end of each lane 24 is a stop member 25 whose height is adjustably controlled.

The distributing apparatus 200 includes a ring-shaped carrier 23 which is provided with three segmental transfer elements 26, 27, 28 uniformly spaced about the periphery of the carrier 23. The transfer elements 26, 27, 28 are each provided with four semicircular pockets 46, 47, 48 and essentially correspond with the transfer elements 7, 8, 9 supported on the carrier 10; the only difference therebetween resides in the fact that the transfer elements 26, 27, 28 do not rotate about their respective rotational axis but rather oscillate about the pivots 38, 39, 40 during the rotation of the carrier 23 in clockwise direction as indicated by arrow 15. The oscillation of the transfer elements 26, 27, 28 is provided via an irregular-motion transmission which includes a stationary cam 31 with a closed groove at the underside of the carrier 23. Each transfer element 26, 27, 28 is provided with a follower 32, 33, 34 connected to the exposed end of respective cantilevers 35, 36, 37 whose other end is fixedly connected with the respective pivot of the transfer elements 26, 27, 28.

During the rotation of the carrier 23 in the direction of arrow 15, the followers 32, 33, 34 run along the cam 31 and are thus brought into a swivelling motion which is transmitted to the transfer elements 26, 27, 28 thereby conferring the latter with the oscillating motion as is also indicated by the dash-dot illustration of transfer element 28 showing an intermediate position thereof between the pick-up point and discharge of a respective group of bottles 21.

As the bottles 21 are transported essentially along the peripheral area of the carrier 23, it is possible to arrange the transport conveyor 29 almost at any desired location along the circumference of the carrier 23.

If it is desired to obtain a higher feeding capacity, the arrangement illustrated in FIG. 2 can simply be modified by extending the transport conveyor 29 e.g. to the right and to provide a further distributing apparatus 200.

Figure 3:
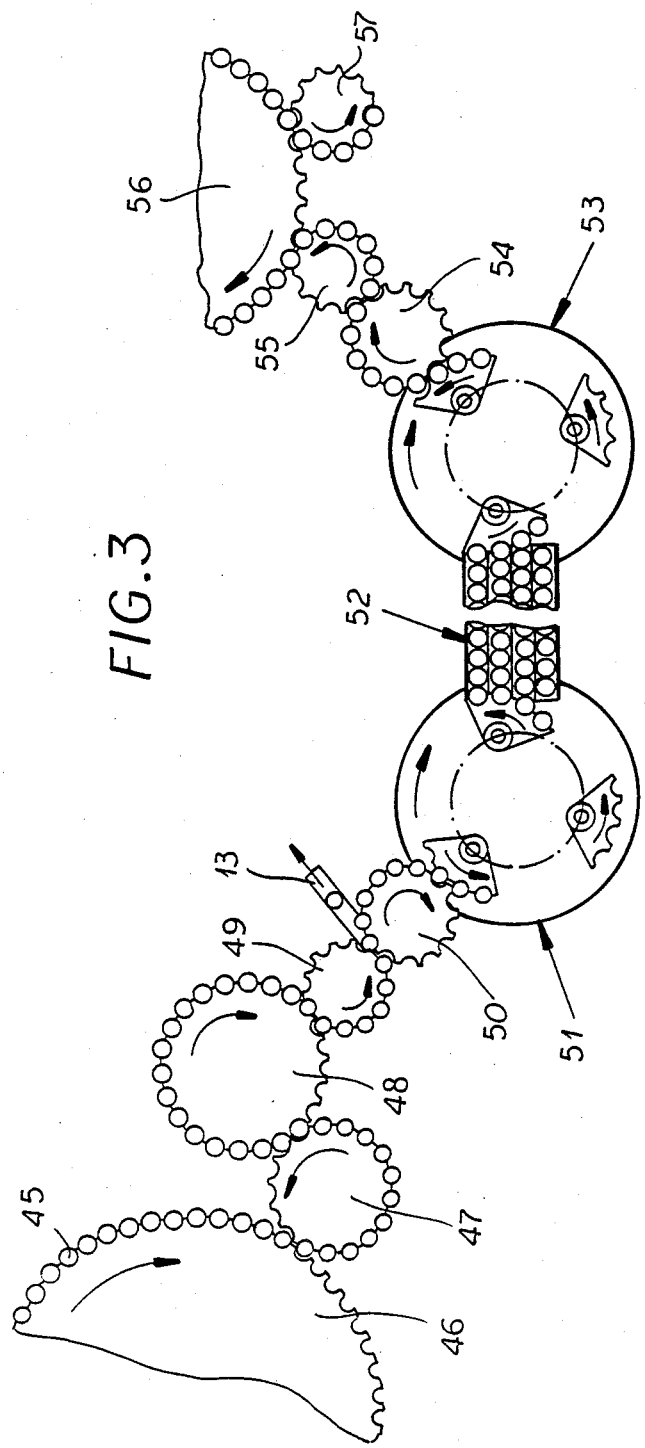
FIG. 3 illustrates a pair of bottle processing machines with intermediate distributing apparatuses according to the invention.

Referring now to FIG. 3 which exemplifies using distributing apparatuses in correspondence with FIGS. 1 and/or 2 within a production line. Accordingly, reference numeral 46 represents a bottling machine from which the bottles 45 are transferred via an intermediate star-wheel conveyor 47 to a capping machine 48. After being closed, the bottles 45 are picked up by a star-wheel conveyor 49 and transferred to a star-wheel conveyor 50. A conveyor belt 13 is additionally arranged between the conveyors 49 and 50 to allow objectionable bottles to be removed.

Cooperating with the conveyor 50 is a first distributing apparatus 51 which consecutively picks up the bottles 45 from the conveyor 50 and deposits them on a multi-lane conveyor belt 52 of sufficient dimension to be used as buffer zone. At the other end of the conveyor 52 is a second distributing apparatus 53 which transfers the bottles 45 via a star-wheel conveyor 54 and a star-wheel conveyor 55 to a labelling machine 56. A star-wheel conveyor 57 cooperates with the labelling machine 56 to transfer the labelled bottles to the successive processing step.

FIG. 3 shows the versatility of the distributing apparatus according to the invention as it allows to pick up bottles successively from single row rotating processing machines or star-wheel conveyors or in groups from a linearly advancing multi-lane conveyor and to deposit them in groups onto such multi-lane conveyors or successively onto respectively rotating single row processing machines or star-wheel conveyors.

We should point out, that in the illustration of FIG. 3, it is certainly possible to omit the star-wheel conveyors 49, 50, 54, 55 so as to transfer the bottles 45 directly from the capping machine 48 to the distributing apparatus 51 and to transfer the capped bottles directly from the distributing apparatus 53 to the labelling machine 56. In case only star-wheel conveyors 50 and 54 are omitted, the distributing apparatuses 51, 53 rotate in direction opposite to the direction indicated by the arrows.

It should also be pointed out that transmissions can be used of other design than the ones shown in FIGS. 2 and 4 in order to rotate or oscillate the transfer elements. As a further example, a planetary gear train may be used which is provided with an internal sun wheel (FIG. 1A) concentrically arranged to the carrier and meshing with a pinion fixedly connected to the exposed end of the respective pivots of the transfer elements. Another possibility is the so-called pick-off gear or summing transmission which includes two independent transmission inputs allowing the independent and varying overlapping of differing drive speeds to provide at the output an arbitrarily accelerated or retarded output speed for the transfer elements.

We claim:

1. In combination with a continuously operating single-line conveyor and with a continuously operating multiline conveyor, an apparatus for transferring upright articles between the single-line conveyor and the multiline conveyor, the apparatus comprising:

- a carrier rotatable about a carrier axis and oriented with the single-line conveyor extending generally tangentially from it and with the multiline conveyor extending generally radially from it, whereby the articles move substantially only tangentially as they pass between the single-line conveyor and the carrier and substantially only radially as they pass between the multiline conveyor and the carrier;
- means for continuously rotating the carrier about its axis at a substantially constant speed;
- at least one transfer segment pivotal on the carrier about a segment axis radially offset from and generally parallel to the carrier axis and having an outer edge directed radially away from its axis and formed with a plurality of article-receiving pockets all opening generally radially from the segment axis and of a number and spacing corresponding to the lines of the multiline conveyor, the transfer segment being pivotal about the transfer axis into and out of a transfer position with its pockets opening radially outward of the carrier axis;
- means for retaining the upright articles in the pockets; and
- drive means connected to the segment for pivoting same angularly of its axis at least once during each revolution of the carrier such that as the segment passes the single-line conveyor the pockets move through the transfer position at a speed equal to the tangential travel speed of the articles in the single-line conveyor and such that as the segment passes the multiline conveyor the pockets move through the transfer position at a speed substantially identical to the peripheral speed of the carrier but in an opposite direction such that movement of the articles around the carrier axis substantially stops in the transfer position at the multiline conveyor.

2. The transfer apparatus defined in claim 1 wherein the drive means rotates the transfer segment angularly of its axis through one full revolution as the carrier displaces the transfer segment between the conveyors.

3. The transfer apparatus defined in claim 1 wherein the outer edge of the segment is generally concave away from the segment axis.

4. The transfer apparatus defined in claim 1 wherein the drive means always rotates the segment in a rotational sense opposite that of the carrier.

5. The transfer apparatus defined in claim 1 wherein the drive means includes;
- a stationary slave cam fixed adjacent the carrier;
- a cam follower engaging the cam; and
- a lever connected between the segment and the follower and linking same together.

6. The transfer apparatus defined in claim 1 wherein the drive means includes;
- a gear fixed adjacent the carrier; and
- a pinion rotationally coupled to the segment and meshing with the gear.

7. The transfer apparatus defined in claim 1 wherein the gear is internally and irregularly toothed and the pinion is a lantern gear.

8. The transfer apparatus defined in claim 1 wherein the means for retaining includes means for applying suction to the articles in the pockets.

9. The transfer apparatus defined in claim 1 wherein the means for retaining includes clips at the pockets engageable with the articles.

* * * * *